US 7,953,957 B2

(12) United States Patent
Gooding et al.

(10) Patent No.: US 7,953,957 B2
(45) Date of Patent: May 31, 2011

(54) MAPPING AND DISTRIBUTING PARALLEL ALGORITHMS TO COMPUTE NODES IN A PARALLEL COMPUTER BASED ON TEMPERATURES OF THE COMPUTE NODES IN A HARDWARE PROFILE AND A HARDWARE INDEPENDENT APPLICATION PROFILE DESCRIBING THERMAL CHARACTERISTICS OF EACH PARALLEL ALGORITHM

(75) Inventors: Thomas M. Gooding, Rochester, MN (US); Brant L. Knudson, Rochester, MN (US); Cory Lappi, Rochester, MN (US); Ruth J. Poole, Rochester, MN (US); Andrew T. Tauferner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 12/029,045

(22) Filed: Feb. 11, 2008

(65) Prior Publication Data

US 2009/0204789 A1 Aug. 13, 2009

(51) Int. Cl.
*G06F 9/50* (2006.01)
*G06F 1/00* (2006.01)

(52) U.S. Cl. ........... 712/28; 712/220; 713/300; 718/102
(58) Field of Classification Search ..................... None
See application file for complete search history.

(56) References Cited

U.S. PATENT DOCUMENTS

| | | | | |
|---|---|---|---|---|
| 5,974,438 A * | 10/1999 | Neufeld | ................. | 718/104 |
| 7,330,983 B2 * | 2/2008 | Chaparro et al. | ............. | 713/300 |
| 7,386,414 B2 * | 6/2008 | Aguilar et al. | ................ | 702/130 |
| 2003/0229662 A1 * | 12/2003 | Luick | ............................ | 709/106 |
| 2004/0128663 A1 * | 7/2004 | Rotem | .......................... | 717/161 |
| 2005/0216775 A1 * | 9/2005 | Inoue | ............................ | 713/300 |
| 2007/0198134 A1 * | 8/2007 | Adachi et al. | ................ | 700/300 |
| 2009/0089792 A1 * | 4/2009 | Johnson et al. | ............... | 718/105 |

* cited by examiner

*Primary Examiner* — David J Huisman
(74) *Attorney, Agent, or Firm* — Biggers & Ohanian, LLP

(57) ABSTRACT

Methods, apparatus, and products for distributing parallel algorithms of a parallel application among compute nodes of an operational group in a parallel computer are disclosed that include establishing a hardware profile, the hardware profile describing thermal characteristics of each compute node in the operational group; establishing a hardware independent application profile, the application profile describing thermal characteristics of each parallel algorithm of the parallel application; and mapping, in dependence upon the hardware profile and application profile, each parallel algorithm of the parallel application to a compute node in the operational group.

15 Claims, 8 Drawing Sheets

MAPPING AND DISTRIBUTING PARALLEL ALGORITHMS TO COMPUTE NODES IN A PARALLEL COMPUTER BASED ON TEMPERATURES OF THE COMPUTE NODES IN A HARDWARE PROFILE AND A HARDWARE INDEPENDENT APPLICATION PROFILE DESCRIBING THERMAL CHARACTERISTICS OF EACH PARALLEL ALGORITHM

BACKGROUND OF THE INVENTION

1. Field of the Invention

The field of the invention is data processing, or, more specifically, methods, apparatus, and products for distributing parallel algorithms of a parallel application among compute nodes of an operational group in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory needed for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations in which all compute nodes participate simultaneously, such as, for example, an allgather operation. An allgather operation is a collective operation on an operational group of compute nodes that concatenates segments of data stored on each compute node in rank order and provides the entire concatenation results to all of the compute nodes in the operational group.

In the current art, parallel computers include many compute nodes and each compute node generates some amount of heat when executing parallel applications. Overheating in a compute node may cause software or hardware failure in the compute node. Controlling overheating is therefore extremely important in parallel computers. In current art controlling overheating in compute nodes is typically carried out by throttling processors, memory busses, and other devices in the compute nodes. Such throttling however slows processing of application. Moreover, some compute nodes have a higher proclivity to overheat. That is, different compute nodes of a parallel computer may have different typical operating temperatures in dependence upon many factors including, for example, hardware configuration of the compute node, proximity to heat generating devices, physical location in a cabinet containing other compute nodes and devices, airflow control in the cabinet, location of the compute node's cabinet relative to other cabinets in a data center, and so on. Readers of skill in the art will recognize therefore that a need exists to protect compute nodes from overheating while taking into account the different typical operating temperatures of compute nodes.

SUMMARY OF THE INVENTION

Methods, apparatus, and products for distributing parallel algorithms of a parallel application among compute nodes of an operational group in a parallel computer are disclosed that include establishing a hardware profile, the hardware profile describing thermal characteristics of each compute node in the operational group; establishing a hardware independent application profile, the application profile describing thermal characteristics of each parallel algorithm of the parallel application; and mapping, in dependence upon the hardware profile and application profile, each parallel algorithm of the parallel application to a compute node in the operational group.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
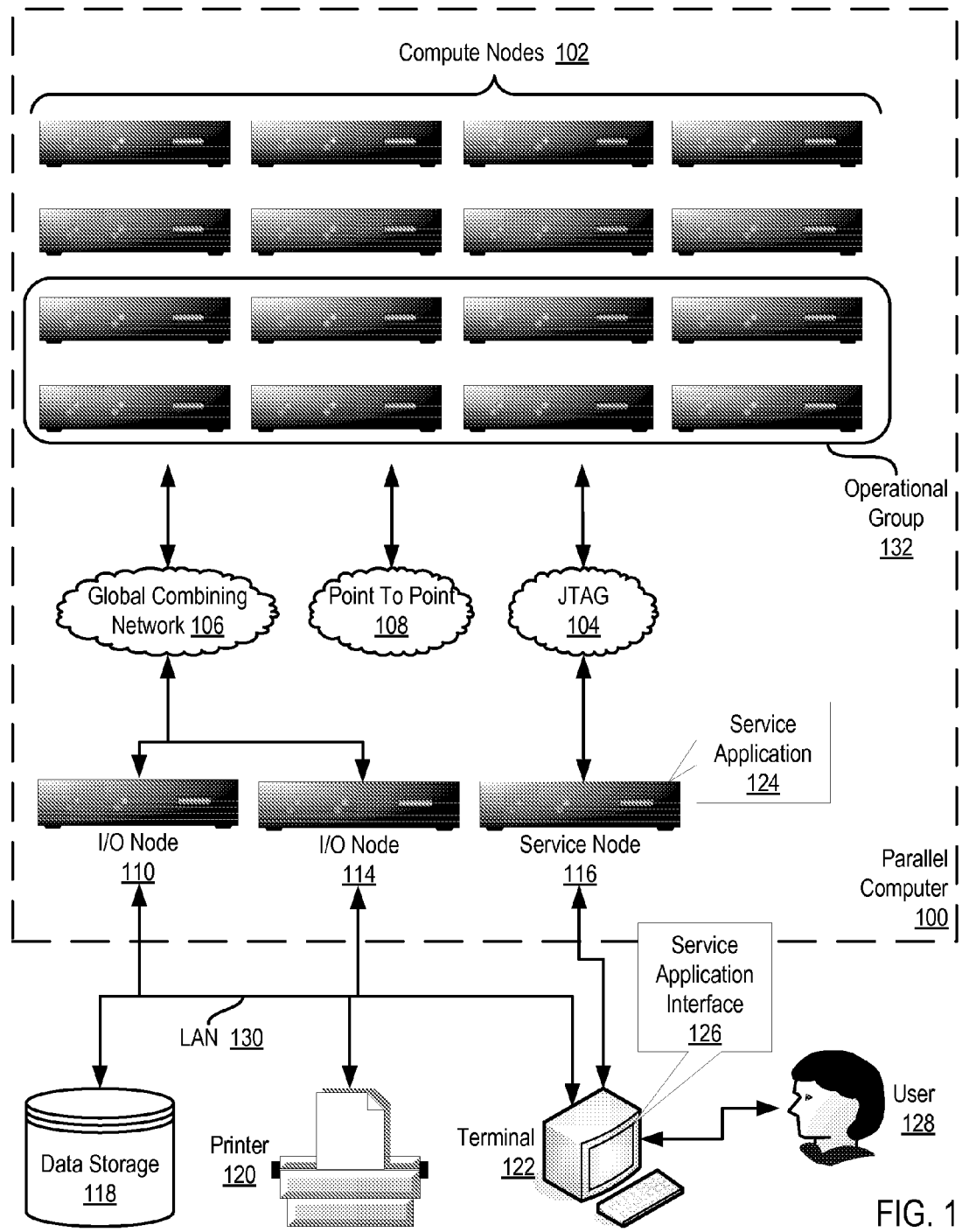
FIG. 1 illustrates an exemplary system for distributing parallel algorithms of a parallel application among compute nodes of an operational group in a parallel computer according to embodiments of the present invention.

Exemplary methods, apparatus, and products for distributing parallel algorithms of a parallel application among compute nodes of an operational group in a parallel computer in accordance with embodiments of the present invention are described with reference to the accompanying drawings, beginning with FIG. 1. FIG. 1 illustrates an exemplary system for distributing parallel algorithms of a parallel application among compute nodes of an operational group in a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount * N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

As described in more detail below in this specification, the service application (124) on the service node (116) in the system of FIG. 1 includes computer program instructions for distributing parallel algorithms of a parallel application among compute nodes of an operational group in a parallel computer according to embodiments of the present invention. The service application (124) of the service node (116) may operate generally for distributing parallel algorithms of a parallel application among compute nodes (102) of an operational group (132) in a parallel computer (100) by establishing a hardware profile, the hardware profile describing thermal characteristics of each compute node (102) in the operational group (132); establishing a hardware independent application profile, the application profile describing thermal characteristics of each parallel algorithm of the parallel application; and mapping, in dependence upon the hardware profile and application profile, each parallel algorithm of the parallel application to a compute node (102) in the operational group (132).

The arrangement of nodes, networks, and I/O devices making up the exemplary system illustrated in FIG. 1 are for explanation only, not for limitation of the present invention. Data processing systems capable of distributing parallel algorithms of a parallel application among compute nodes of an operational group in a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of distributing parallel algorithms of a parallel application among compute nodes of an operational group in a parallel computer according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Distributing parallel algorithms of a parallel application among compute nodes of an operational group in a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of distributing parallel algorithms of a parallel application among compute nodes of an operational group in a parallel computer according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
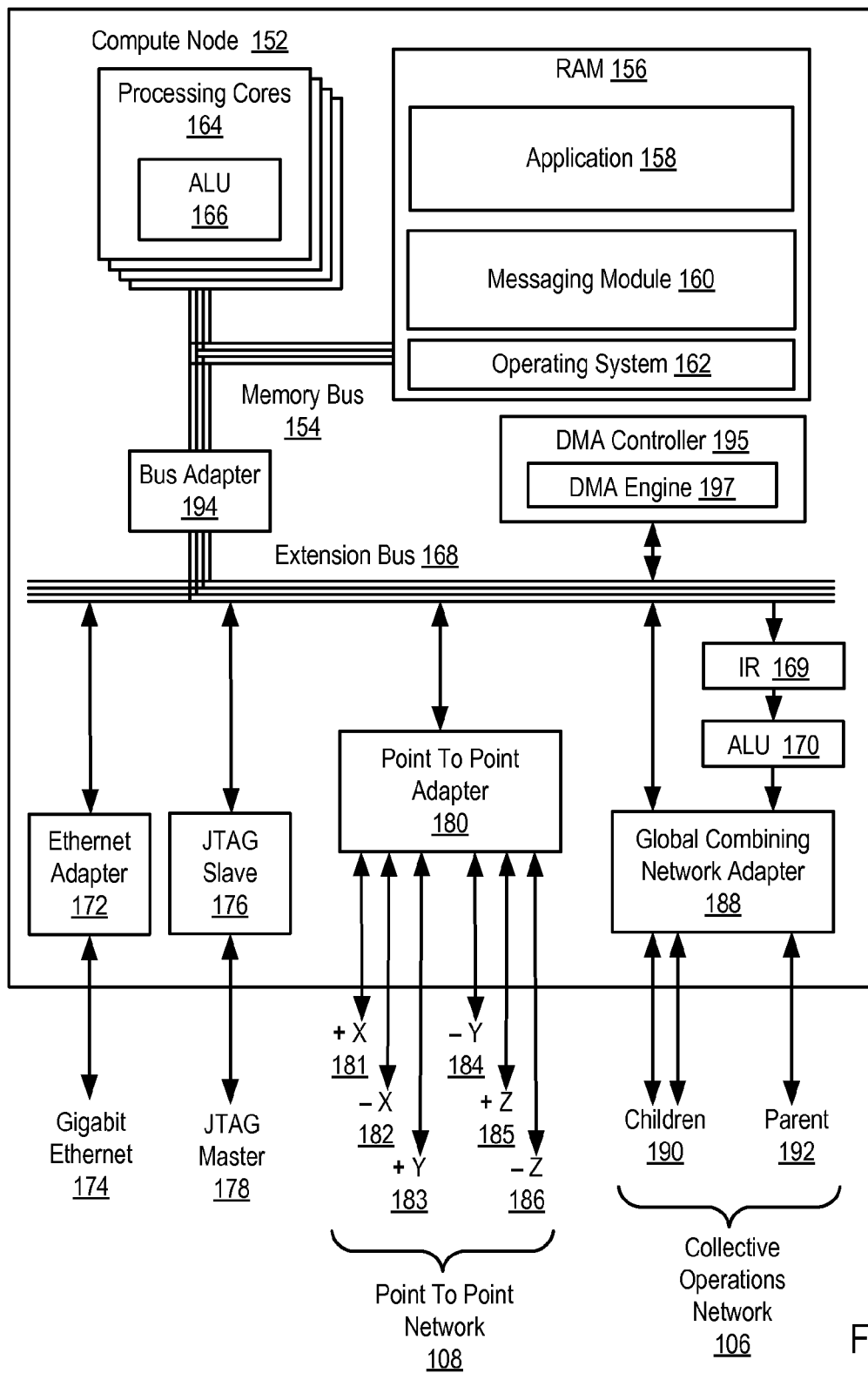
FIG. 2 sets forth a block diagram of an exemplary compute node useful in a parallel computer capable of distributing parallel algorithms of a parallel application among compute nodes of an operational group in a parallel computer according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for distributing parallel algorithms of a parallel application among compute nodes of an operational group in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in distributing parallel algorithms of a parallel application among compute nodes of an operational group in a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node(192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. The DMA engine (197) of FIG. 2 is typically stored in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
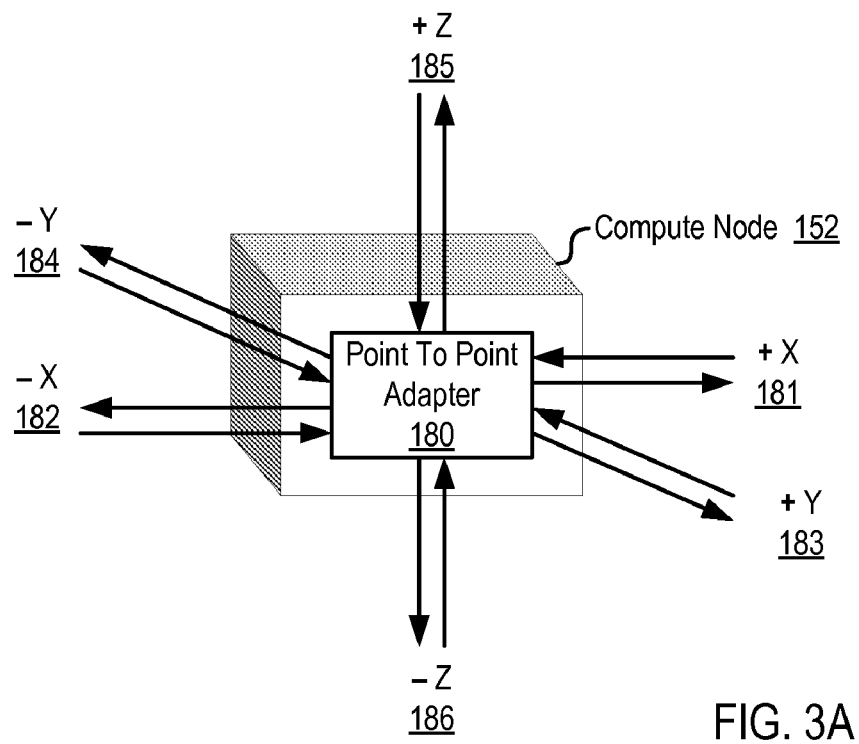
FIG. 3A illustrates an exemplary Point To Point Adapter useful in systems capable of distributing parallel algorithms of a parallel application among compute nodes of an operational group in a parallel computer according to embodiments of the present invention.

For further explanation, FIG. 3A illustrates an exemplary Point To Point Adapter (180) useful in systems capable of distributing parallel algorithms of a parallel application among compute nodes of an operational group in a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
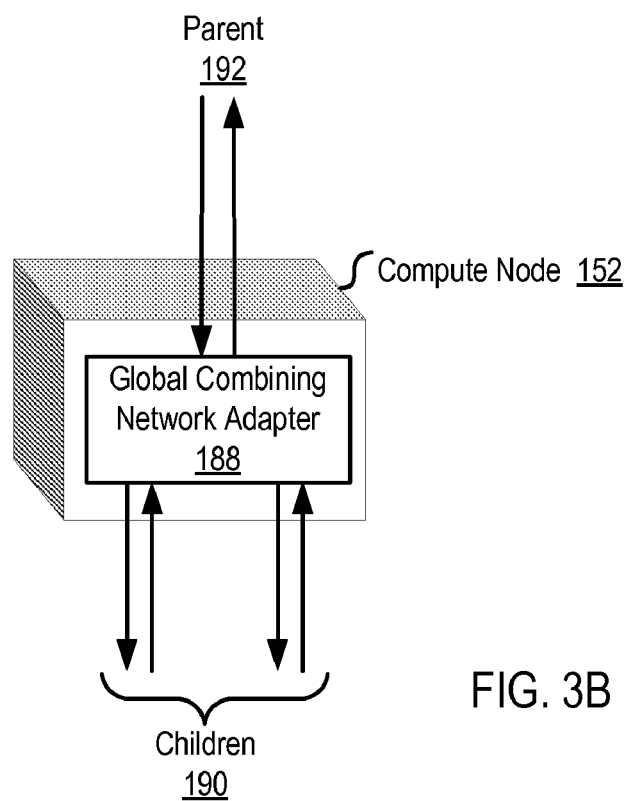
FIG. 3B illustrates an exemplary Global Combining Network Adapter useful in systems capable of distributing parallel algorithms of a parallel application among compute nodes of an operational group in a parallel computer according to embodiments of the present invention.

For further explanation, FIG. 3B illustrates an exemplary Global Combining Network Adapter (188) useful in systems capable of distributing parallel algorithms of a parallel application among compute nodes of an operational group in a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
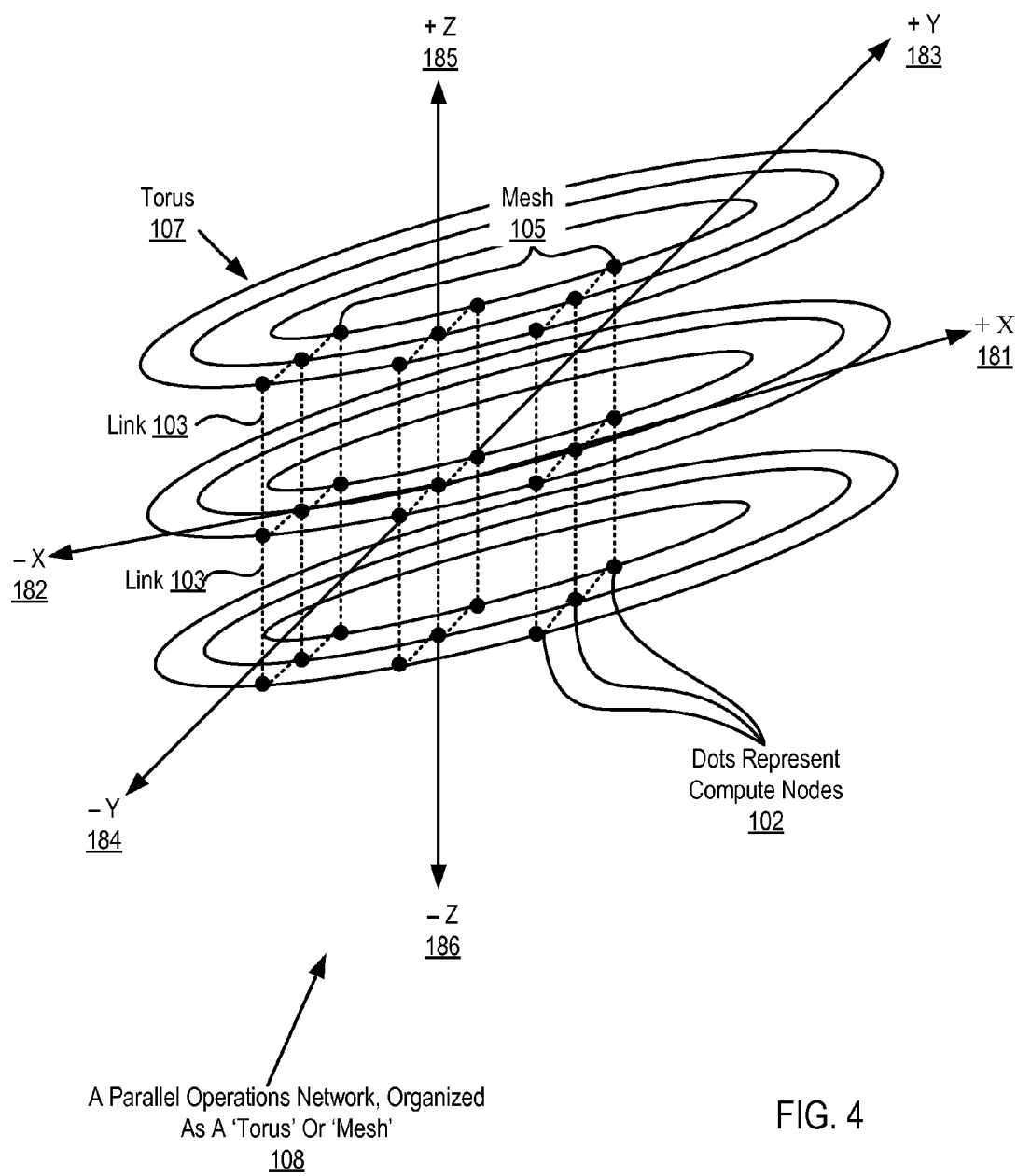
FIG. 4 sets forth a line drawing illustrating an exemplary data communications network optimized for point to point operations useful in systems capable of distributing parallel algorithms of a parallel application among compute nodes of an operational group in a parallel computer in accordance with embodiments of the present invention.

For further explanation, FIG. 4 sets forth a line drawing illustrating an exemplary data communications network (108) optimized for point to point operations useful in systems capable of distributing parallel algorithms of a parallel application among compute nodes of an operational group in a parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in distributing parallel algorithms of a parallel application among compute nodes of an operational group in a parallel computer in accordance with embodiments of the present invention may contain only a few compute nodes or may contain thousands of compute nodes.

Figure 5:
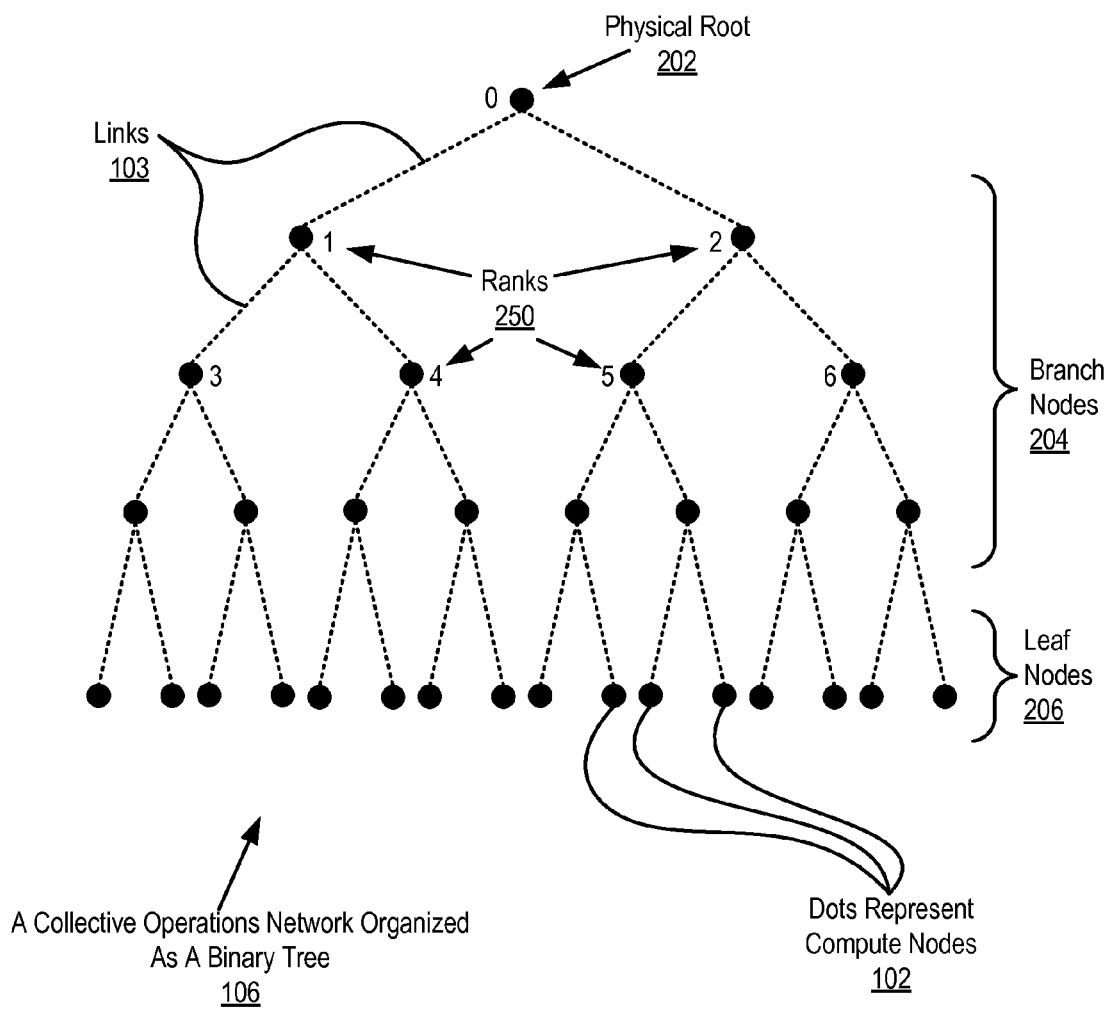
FIG. 5 sets forth a line drawing illustrating an exemplary data communications network optimized for collective operations useful in systems capable of distributing parallel algorithms of a parallel application among compute nodes of an operational group in a parallel computer in accordance with embodiments of the present invention.

For further explanation, FIG. 5 sets forth a line drawing illustrating an exemplary data communications network (106) optimized for collective operations useful in systems capable of distributing parallel algorithms of a parallel application among compute nodes of an operational group in a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. Each of the branch nodes (204) has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for distributing parallel algorithms of a parallel application among compute nodes of an operational group in a parallel computer in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
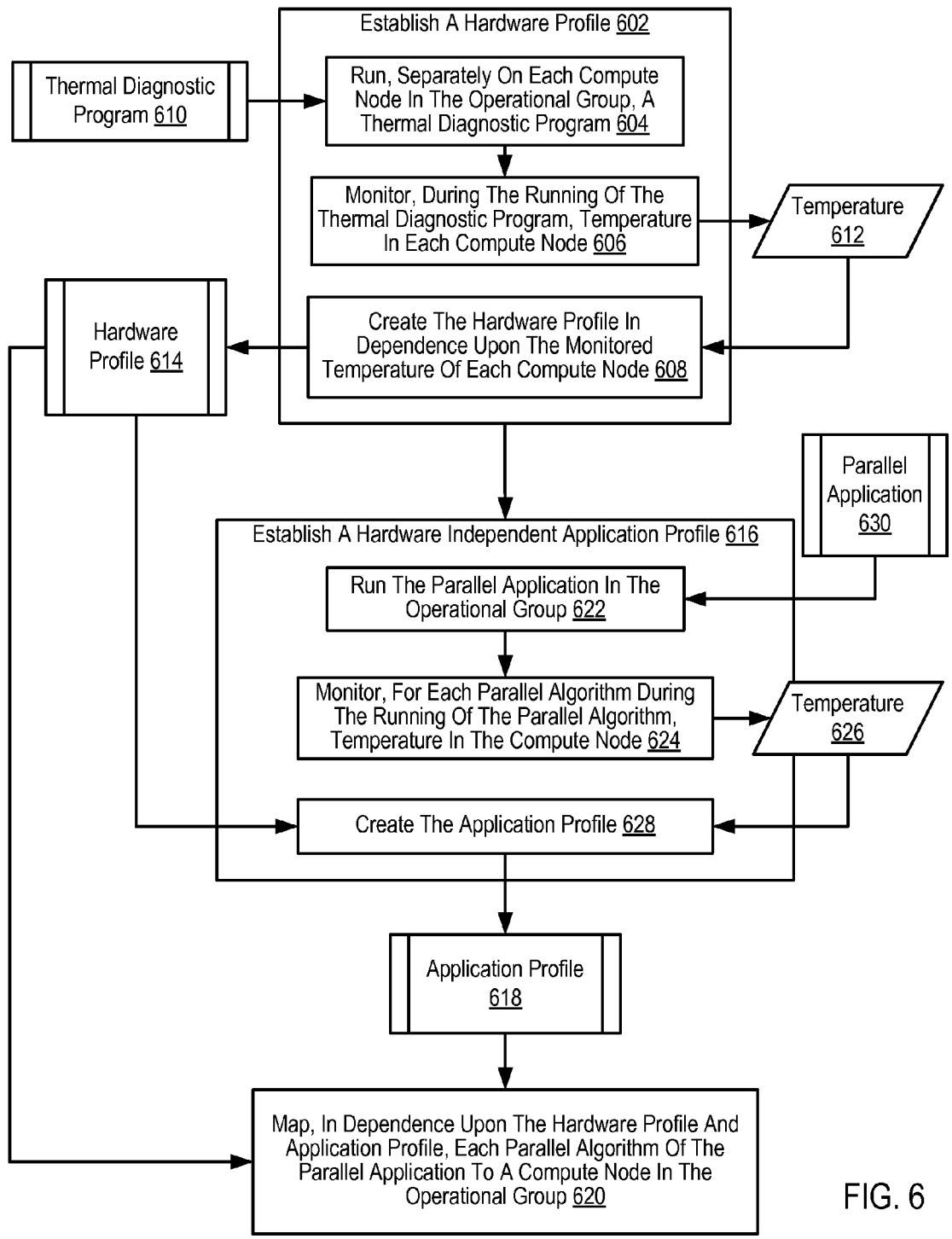
FIG. 6 sets forth a flow chart illustrating an exemplary method for distributing parallel algorithms of a parallel application among compute nodes of an operational group in a parallel computer according to embodiments of the present invention.

For further explanation, FIG. 6 sets forth a flow chart illustrating an exemplary method for distributing parallel algorithms of a parallel application (630) among compute nodes of an operational group in a parallel computer according to embodiments of the present invention. The method of FIG. 6 includes establishing (602) a hardware profile (614), the hardware profile (602) describing thermal characteristics of each compute node in the operational group. A hardware profile may be implemented as a data structure, such as a table, for example, that includes information describing, individually, thermal characteristics of each compute node under typical operating conditions. As mentioned above, various physical factors may cause some compute nodes to operate at varying thermal characteristics relative to other compute nodes. That is, some compute nodes run hotter than other compute nodes under typical operations. Such physical factors that cause varying thermal characteristics between compute nodes may include, for example, hardware configuration of the compute node, proximity to heat generating devices, location in a cabinet, airflow control in the cabinet, location of the compute node's cabinet relative to other cabinets in a data center, and so on as will occur to those of skill in the art. The exemplary hardware profile (602) of FIG. 6 may be used to normalize these varying thermal characteristics between compute nodes caused by physical characteristics of each node. That is, the thermal profile may identify those compute nodes that typically run hotter than other compute nodes due only to physical factors of the compute nodes and the thermal profile may identify an amount an amount of variation in thermal characteristics relative to other compute nodes.

In the method of FIG. 6, establishing (602) a hardware profile (614) may be carried out by running (604), separately on each compute node in the operational group, a thermal diagnostic program (610); monitoring (606), during the running of a the thermal diagnostic program, temperature (612) in each compute node; and creating (608) the hardware profile (614) in dependence upon the monitored temperature (612) of each compute node.

A thermal diagnostic program may be a module of computer program instructions that are executed separately on each compute node of an operational group while measuring typical heat generation in the compute node during execution of the instructions. By running identical computer program instructions on each compute node separately and measuring temperature in each compute node during the execution of the instructions, typical temperature variations between the compute nodes caused by various physical factors may be identified.

Monitoring temperature in a compute node may be carried out by polling temperature sensors in each compute node. Various temperature sensors may be installed in a compute node in accordance with embodiments of the present invention. Typically a temperature sensor is located on or near a computer processor in the compute nodes. The monitored temperature may represent a peak temperature during the running of the diagnostic program, an average temperature during the running of the diagnostic program, the median temperature during the running of the diagnostic, or others as will occur to those of skill in the art.

Creating (608) the hardware profile (614) in dependence upon the monitored temperature (612) of each compute node may be carried out by associating in a data structure an identification of each compute node in the operational group and the temperature or each compute node monitored during the execution of the thermal diagnostic program on the compute node. Consider the exemplary hardware profile represented in Table 1 below as an example.

TABLE 1

| Hardware Profile | |
|---|---|
| Compute Node ID (X, Y, Z) | Monitored Temp. (Degrees Celsius) |
| (0, 0, 0) | 10 |
| (1, 0, 0) | 15 |
| (0, 1, 0) | 24 |
| (1, 1, 0) | 30 |

Table 1 above includes an exemplary hardware profile describing thermal characteristics of four compute nodes in an operational group. The compute nodes are identified in a column of compute node identifications by X,Y,Z coordinates as compute nodes located at (0,0,0), (1,0,0), (0,1,0), and (1,1,0). Although only four compute nodes are represented in the example hardware profile of Table 1, readers of skill in the art will recognize that any number of compute nodes may be represented in a hardware profile useful for distributing parallel algorithms of a parallel application among compute nodes of an operational group in a parallel computer according to embodiments of the present invention.

Table 1 also includes a column of temperatures in degrees Celsius for each compute node monitored during the execution of the thermal diagnostic program on each compute node. The monitored temperatures represented in the example hardware profile of Table 1 may represent a peak temperature reached in a compute node during execution of the thermal diagnostic program in the compute node, or the temperature may represent the average temperature in a compute node during execution of the thermal diagnostic program in the compute node. The temperature monitored in the compute node located at (0,0,0) during execution of the thermal diagnostic program is 10 degrees Celsius. The temperature monitored in the compute node located at (1,0,0) during execution of the thermal diagnostic program is 15 degrees Celsius. The temperature monitored in the compute node located at (0,1,0) during execution of the thermal diagnostic program is 24 degrees Celsius. The temperature monitored in the compute node located at (1,1,0) during execution of the thermal diagnostic program is 30 degrees Celsius. Under typical operating conditions therefore the node located at (1,1,0) runs hotter than the node located at (0,1,0) which runs hotter than the node located at (1,0,0) which, in turn, runs hotter than the node located at (0,0,0).

In addition to establishing (602) a hardware profile (614) the method of FIG. 6 also includes establishing (616) a hardware independent application profile (618), the application profile (618) describing thermal characteristics of each parallel algorithm of the parallel application (630). An application profile may be implemented as a data structure, such as a table, that includes information describing thermal characteristics of each parallel algorithm of the parallel application. An application profile is described as hardware independent because the thermal characteristics of each parallel algorithm of the parallel application are representative of thermal variations caused only by the running of the algorithm, not by physical factors of a compute node.

Establishing (616) a hardware independent application profile (618) may be carried out in various ways. In the method of FIG. 6, for example, establishing (616) a hardware independent application profile (618) may be carried out by running (622) the parallel application (630) in the operational group, including running parallel algorithms of the parallel application in one or more compute nodes in the operational group; monitoring (624), for each parallel algorithm running in a compute node of the operational group during the running of the parallel algorithm, temperature (626) in the compute node; and creating (628) the application profile in dependence upon the monitored temperature (626) for each parallel algorithm run in a compute node and the hardware profile. Some parallel applications are run many times on the same hardware. A hardware independent application profile in accordance with embodiments of the present invention may be established on the first run of the application and thereafter may be used in mapping the parallel algorithms of the parallel applications to compute nodes for execution.

Like the temperature (612) monitored during execution of the thermal diagnostic program (610) when establishing (602) the hardware profile (614), the temperature (626) monitored during the running (622) of the parallel application in the operation group may represent a peak temperature, an average temperature, or other temperature as will occur to those of skill in the art.

Creating (628) the application profile in dependence upon the monitored temperature (626) for each parallel algorithm run in a compute node and the hardware profile may be carried out by associating in a data structure an identification of a parallel algorithm and a temperature, normalized with respect to the thermal characteristics of the compute node on which the parallel algorithm was executed. Again consider the exemplary hardware profile of Table 1, above, having as monitored temperatures, an average temperature during the execution of the thermal diagnostic program. Also consider the average temperature (626) of the compute nodes located at (0,0,0), (1,0,0), (0,1,0), and (1,1,0) monitored during execution of a parallel algorithm in each of the compute nodes is, respectively, 15, 22, 30, and 35 degrees Celsius. An algorithm identified as WorkUnit_0 was executed in the compute node located at (0,0,0), an algorithm identified as WorkUnit_1 was executed in the compute node located at (1,0,0), an algorithm identified as WorkUnit_2 was executed in the compute node located at (0,1,0), and an algorithm identified as WorkUnit_3 was executed in the compute node located at (1,1,0). Creating an application profile in dependence upon the monitored temperature (626) and the hardware profile of Table 1 may yield an application profile represented in Table 2 below.

TABLE 2

| Hardware Independent Application Profile | |
|---|---|
| Parallel Algorithm Identification | Monitored Temp. (Degrees Celsius) |
| WorkUnit_0 | 5 |
| WorkUnit_1 | 7 |
| WorkUnit_2 | 6 |
| WorkUnit_3 | 5 |

Table 2 above includes an exemplary hardware independent application profile describing thermal characteristics of four parallel algorithms of a parallel application. The parallel algorithms are identified in column of parallel algorithm identifications as WorkUnit_0, WorkUnit_1, WorkUnit_2, and WorkUnit_3. Such parallel algorithms may have as many or as few computer program instructions as specified by a user. Some parallel algorithms of a parallel application, for example, may include the same number of instructions while other parallel algorithms of a parallel application may represent functional units of work and include as many instructions as is necessary to carry out the function of the functional unit of work.

Table 2 also includes a column of temperatures in degrees Celsius for each parallel algorithm of the parallel application. The temperatures represented in Table 2 are hardware independent. Consider for example the temperature associated with the parallel algorithm identified as WorkUnit_0 which was executed in the compute node located at (0,0,0). Although the monitored temperature of the compute node located at (0,0,0) during the execution of the parallel algorithm identified as WorkUnit_0 was 15 degrees Celsius, the application profile represents that thermal characteristics of WorkUnit_0 is 5 degrees Celsius. The typical average operating temperature of the compute node located at (0,0,0), 10 degrees Celsius, is factored out to produce a hardware independent temperature associated with the parallel algorithm. In a similar fashion, the average operating temperatures of the compute nodes located at (1,0,0), (0,1,0), and (1,1,0) have been factored out, respectively, from the temperatures monitored during execution of the parallel algorithms identified as WorkUnit_1, WorkUnit_2, and WorkUnit_3.

The method of FIG. 6 also includes mapping (620), in dependence upon the hardware profile (614) and application profile (620), each parallel algorithm of the parallel application (630) to a compute node in the operational group. As described in detail below with respect to FIG. 8 mapping (620) each parallel algorithm of the parallel application (630) to a compute node in the operational group may be carried out generally by mapping parallel algorithms having thermal characteristics representing greater heat generation to compute nodes having thermal characteristics representing greater heat dissipation. That is, "hot" algorithms are mapped to "cool" compute nodes, and "cool" algorithms are mapped to "hot" compute nodes. In this way, heat generation and therefore overheating in each compute node of an operational group can be controlled without throttling any parameter in the compute nodes during execution of the parallel application.

Figure 7:
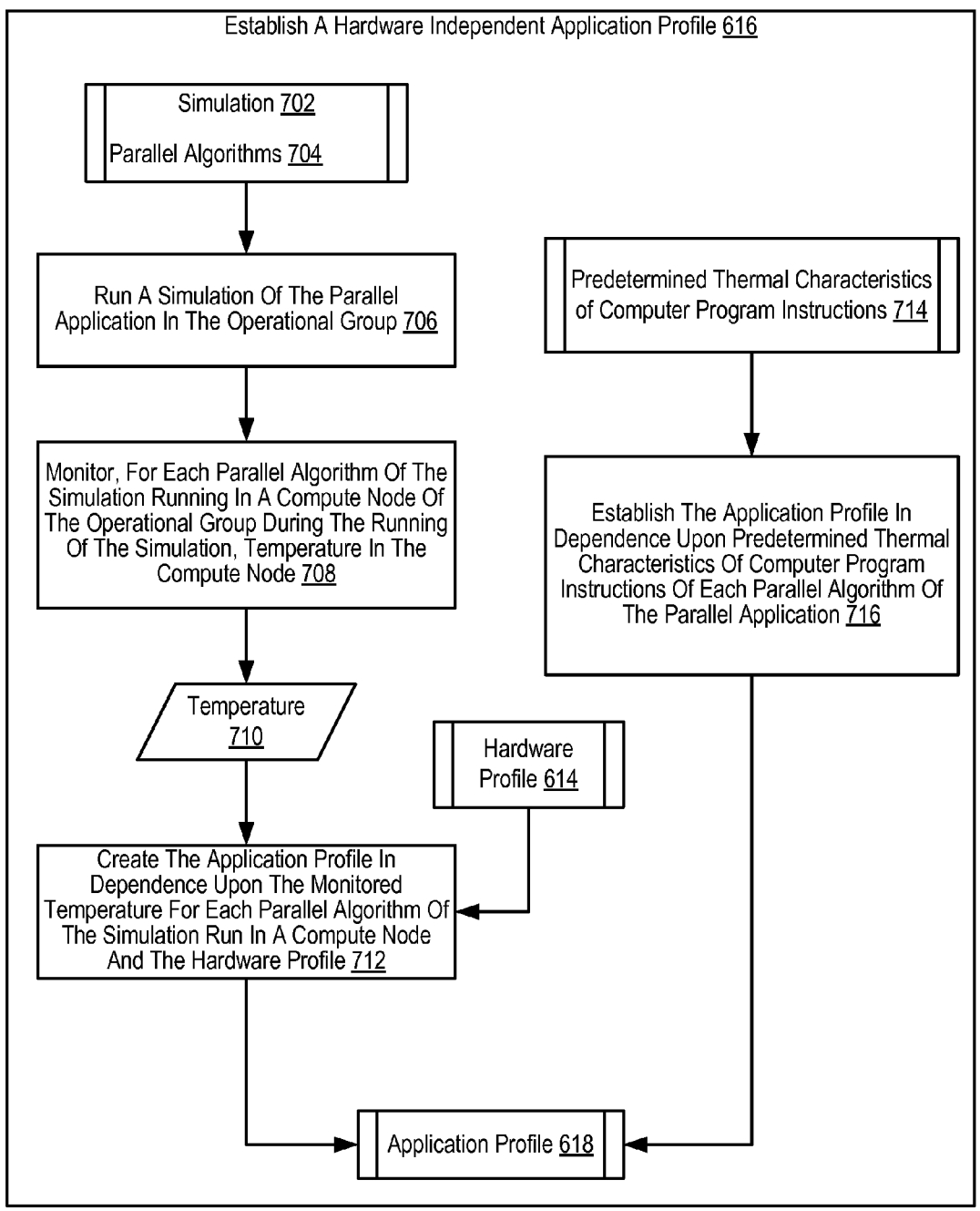
FIG. 7 sets forth a flow chart illustrating two further exemplary alternative methods for establishing a hardware independent application profile.

As mentioned above, establishing (616) a hardware independent application profile (618) may be carried out in various ways. For further explanation, therefore, FIG. 7 sets forth a flow chart illustrating two further exemplary alternative methods for establishing (616) a hardware independent application profile (618). In the method of FIG. 7, for example, establishing (616) a hardware independent application profile (618) may include running (706) a simulation (702) of the parallel application in the operational group. The exemplary simulation (702) of FIG. 7 includes parallel algorithms (704) representing the parallel algorithms of the parallel application and the simulation (702) uses less computational overhead than the parallel application when executed. That is, the simulation may be run faster and with less power, computational and otherwise, than the actual parallel application which it represents. Parallel algorithms of the simulation are similar in some aspect to parallel algorithms of the actual parallel application. A parallel algorithm of the simulation may have only one floating point operation, for example, while the algorithm it represents includes ten such floating point operations. A parallel algorithm of the simulation may manipulate a smaller amount of data than the parallel algorithm of the application which it represents. The simulation, when run, will generate an amount of heat in the compute nodes similar to the amount generated by the actual application, but on a smaller scale.

Establishing (616) a hardware independent application profile (618) may also include monitoring (708), for each parallel algorithm (704) of the simulation (702) running in a compute node of the operational group during the running (706) of the simulation (702), temperature (710) in the compute node and creating (712) the application profile in dependence upon the monitored temperature (712) for each parallel algorithm of the simulation run in a compute node and the hardware profile (614). Monitoring temperature and creating the application profile may be carried out as described above.

As an alternative to running (706) a simulation (702) in the operational group, establishing (616) a hardware independent application profile (618) may be carried out by establishing (716) the application profile (618) in dependence upon predetermined thermal characteristics (714) of computer program instructions of each parallel algorithm of the parallel application. Particular types of computer program instructions typically generate more heat than other types. Floating point operations, for example, typically generate more heat than load/store operations which, in turn, typically generate more heat than integer math operations.

An application profile, instead of associating temperatures and parallel algorithms, may associate a thermal profile score with each parallel algorithm. A thermal profile score may be calculated by identifying for an algorithm a number of computer program instructions in the algorithm of each type to the total number of computer program instructions in the algorithm, multiplying each number by a weight associated with the each type, thereby providing products, and summing the products. Consider for example that floating point operations have a weight of three, load/store operations have a weight of two, and integer math operations have a weight of one. Calculating a thermal profile score, for example, for an algorithm having ten floating point operations, ten load/store operations, and ten integer math operations results in a thermal profile score of 60. An application profile associating such thermal profile scores and parallel algorithms may be used in mapping the parallel algorithms to compute nodes by mapping parallel algorithms having higher thermal profile scores to compute nodes having thermal characteristics representing greater heat dissipation and vice versa. In this way parallel algorithms having computer program instructions that typically generate more heat are mapped to compute nodes with better cooling characteristics.

As yet another example, an application profile, instead of associating temperatures and parallel algorithms or thermal profile scores with parallel algorithms, may alternatively associate a number of instructions with a parallel algorithm. Parallel algorithms having a greater number of computer program instructions typically generate more heat than those algorithms having fewer computer program instructions. As such, an application profile associating number of instructions and parallel algorithms may be used to map the parallel instructions having the greatest number of instructions with the compute nodes having thermal characteristics representing the greatest heat dissipation and vice versa.

Figure 8:
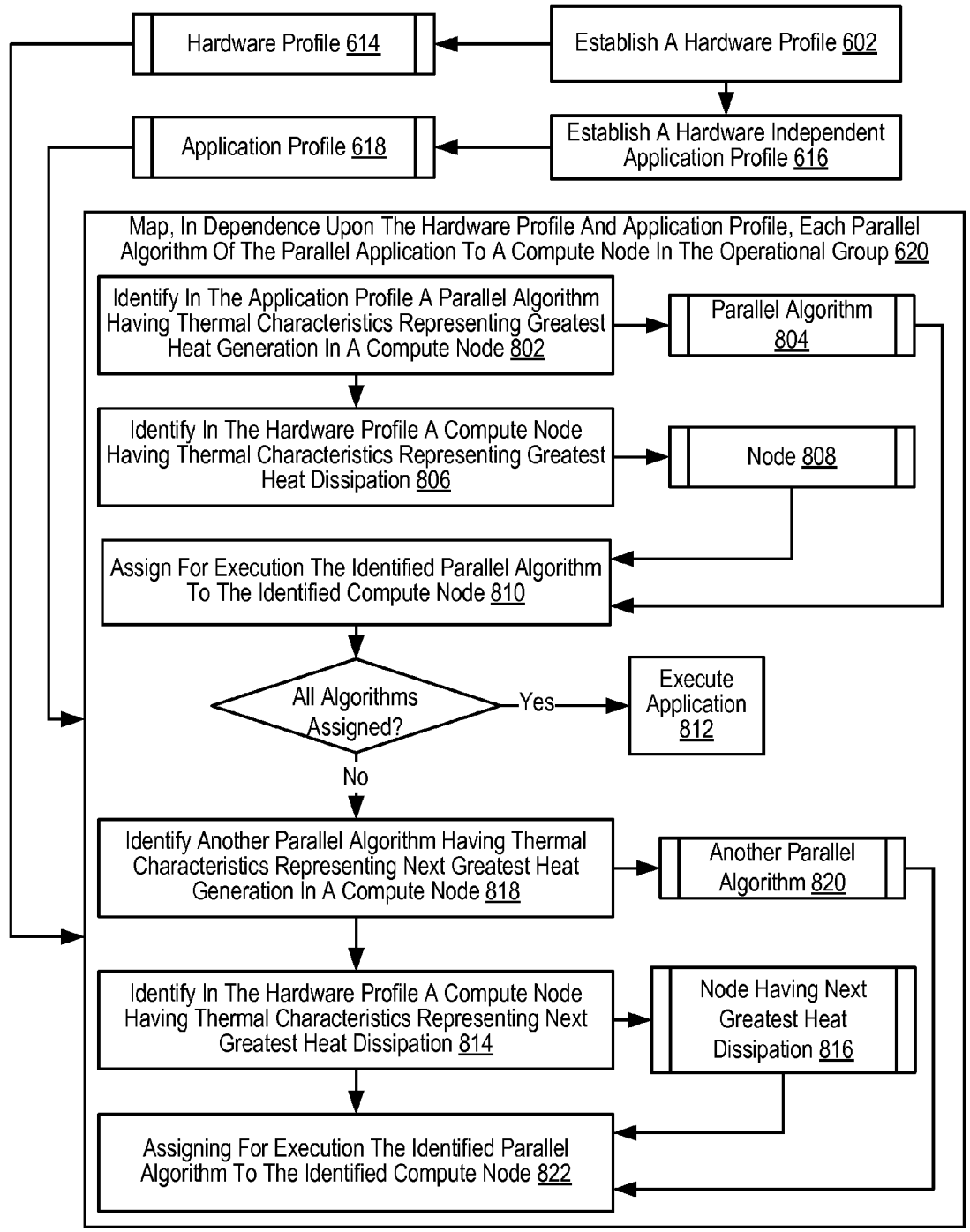
FIG. 8 sets forth a flow chart illustrating a further exemplary method for distributing parallel algorithms of a parallel application among compute nodes of an operational group in a parallel computer according to embodiments of the present invention.

For further explanation, FIG. 8 sets forth a flow chart illustrating a further exemplary method for distributing parallel algorithms of a parallel application among compute nodes of an operational group in a parallel computer according to embodiments of the present invention. The method of FIG. 8 is similar to the method of FIG. 6 in the method of FIG. 8 also includes establishing (602) a hardware profile (614); establishing (616) a hardware independent application profile (618); and mapping (620), in dependence upon the hardware profile (614) and application profile (620), each parallel algorithm of the parallel application (630) to a compute node in the operational group.

The method of FIG. 8 differs from the method of FIG. 6, however, in that in the method of FIG. 8 mapping (620), in dependence upon the hardware profile (614) and application profile (620), each parallel algorithm of the parallel application to a compute node in the operational group includes identifying (802) in the application profile (618) a parallel algorithm (804) having thermal characteristics representing greatest heat generation in a compute node; identifying (806) in the hardware profile (806) a compute node (808) having thermal characteristics representing greatest heat dissipation; and assigning (810) for execution the identified parallel algorithm (804) to the identified compute node (808).

In the method of FIG. 8, mapping (620) each parallel algorithm of the parallel application to a compute node in the operational group continues iteratively until all other parallel algorithms of the parallel application are assigned for execution to a compute node by identifying (818) in the application profile (618) another parallel algorithm (820) having thermal characteristics representing next greatest heat generation in a compute node; identifying (814) in the hardware profile (614) a compute node (816) having thermal characteristics representing next greatest heat dissipation; and assigning (822) for execution the identified parallel algorithm (820) to the identified compute node (816).

Exemplary embodiments of the present invention are described largely in the context of a fully functional computer system for distributing parallel algorithms of a parallel application among compute nodes of an operational group in a parallel computer. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of distributing parallel algorithms of a parallel application among compute nodes of an operational group in a parallel computer, the method comprising:
   running, separately on each compute node in the operational group, a thermal diagnostic program;
   monitoring, during the running of the thermal diagnostic program, a temperature in each compute node;
   establishing a hardware profile, wherein the hardware profile includes the temperature of each compute node in the operational group;
   establishing a hardware independent application profile, the hardware independent application profile describing thermal characteristics of each parallel algorithm of the parallel application, wherein entries in the hardware independent application profile are normalized with respect to the temperatures, from the hardware profile, of the compute nodes on which the parallel algorithms execute; and
   mapping, in dependence upon the hardware profile and the hardware independent application profile, each parallel algorithm of the parallel application to a compute node in the operational group.

2. The method of claim 1 wherein establishing the hardware independent application profile further comprises:
   running the parallel application in the operational group, including running parallel algorithms of the parallel application in one or more compute nodes in the operational group;
   monitoring, for each parallel algorithm running in a compute node of the operational group during the running of the parallel application, temperature in the compute node; and
   creating the hardware independent application profile in dependence upon the monitored temperature for each parallel algorithm run in a compute node and the hardware profile.

3. The method of claim 1 wherein establishing the hardware independent application profile further comprises:
   running a simulation of the parallel application in the operational group, the simulation comprising parallel algorithms representing the parallel algorithms of the parallel application, the simulation using less computational overhead than the parallel application;
   monitoring, for each parallel algorithm of the simulation running in a compute node of the operational group during the running of the simulation, temperature in the compute node; and
   creating the hardware independent application profile in dependence upon the monitored temperature for each parallel algorithm of the simulation run in a compute node and the hardware profile.

4. The method of claim 1 wherein establishing the hardware independent application profile further comprises:
   establishing the hardware independent application profile in dependence upon predetermined thermal characteristics of computer program instructions of each parallel algorithm of the parallel application.

5. The method of claim 1 wherein mapping, in dependence upon the hardware profile and the hardware independent application profile, each parallel algorithm of the parallel application to a compute node in the operational group further comprises:
   identifying in the hardware independent application profile a parallel algorithm having thermal characteristics representing greatest heat generation in a compute node;
   identifying in the hardware profile a compute node having thermal characteristics representing greatest heat dissipation;
   assigning for execution the identified parallel algorithm to the identified compute node; and
   iteratively until all other parallel algorithms of the parallel application are assigned for execution to a compute node:
      identifying in the hardware independent application profile a next parallel algorithm having thermal characteristics representing next greatest heat generation in a compute node;
      identifying in the hardware profile a next compute node having thermal characteristics representing next greatest heat dissipation; and
      assigning for execution the identified next parallel algorithm to the identified next compute node.

6. An apparatus for distributing parallel algorithms of a parallel application among compute nodes of an operational group in a parallel computer, the apparatus comprising a computer processor, a computer memory operatively coupled to the computer processor, the computer memory having disposed within it computer program instructions capable of:
   running, separately on each compute node in the operational group, a thermal diagnostic program;
   monitoring, during the running of the thermal diagnostic program, a temperature in each compute node;
   establishing a hardware profile, wherein the hardware profile includes the temperature of each compute node in the operational group;
   establishing a hardware independent application profile, the hardware independent application profile describing thermal characteristics of each parallel algorithm of the parallel application, wherein entries in the hardware independent application profile are normalized with respect to the temperatures, from the hardware profile, of the compute nodes on which the parallel algorithms execute; and
   mapping, in dependence upon the hardware profile and the hardware independent application profile, each parallel algorithm of the parallel application to a compute node in the operational group.

7. The apparatus of claim 6 wherein establishing the hardware independent application profile further comprises:
   running the parallel application in the operational group, including running parallel algorithms of the parallel application in one or more compute nodes in the operational group;

monitoring, for each parallel algorithm running in a compute node of the operational group during the running of the parallel application, temperature in the compute node; and creating the hardware independent application profile in dependence upon the monitored temperature for each parallel algorithm run in a compute node and the hardware profile.

8. The apparatus of claim 6 wherein establishing the hardware independent application profile further comprises:

running a simulation of the parallel application in the operational group, the simulation comprising parallel algorithms representing the parallel algorithms of the parallel application, the simulation using less computational overhead than the parallel application;

monitoring, for each parallel algorithm of the simulation running in a compute node of the operational group during the running of the simulation, temperature in the compute node; and creating the hardware independent application profile in dependence upon the monitored temperature for each parallel algorithm of the simulation run in a compute node and the hardware profile.

9. The apparatus of claim 6 wherein establishing the hardware independent application profile further comprises:

establishing the hardware independent application profile in dependence upon predetermined thermal characteristics of computer program instructions of each parallel algorithm of the parallel application.

10. The apparatus of claim 6 wherein mapping, in dependence upon the hardware profile and the hardware independent application profile, each parallel algorithm of the parallel application to a compute node in the operational group further comprises:

identifying in the hardware independent application profile a parallel algorithm having thermal characteristics representing greatest heat generation in a compute node;

identifying in the hardware profile a compute node having thermal characteristics representing greatest heat dissipation;

assigning for execution the identified parallel algorithm to the identified compute node; and iteratively until all other parallel algorithms of the parallel application are assigned for execution to a compute node:

identifying in the hardware independent application profile a next parallel algorithm having thermal characteristics representing next greatest heat generation in a compute node;

identifying in the hardware profile a next compute node having thermal characteristics representing next greatest heat dissipation; and assigning for execution the identified next parallel algorithm to the identified next compute node.

11. A computer program product for distributing parallel algorithms of a parallel application among compute nodes of an operational group in a parallel computer, the computer program product disposed in a recordable computer readable medium, the computer program product comprising computer program instructions capable of:

running, separately on each compute node in the operational group, a thermal diagnostic program;

monitoring, during the running of the thermal diagnostic program, a temperature in each compute node;

establishing a hardware profile, wherein the hardware profile includes the temperature of each compute node in the operational group;

establishing a hardware independent application profile, the hardware independent application profile describing thermal characteristics of each parallel algorithm of the parallel application, wherein entries in the hardware independent application profile are normalized with respect to the temperatures, from the hardware profile, of the compute nodes on which the parallel algorithms execute; and mapping, in dependence upon the hardware profile and the hardware independent application profile, each parallel algorithm of the parallel application to a compute node in the operational group.

12. The computer program product of claim 11 wherein establishing the hardware independent application profile further comprises:

running the parallel application in the operational group, including running parallel algorithms of the parallel application in one or more compute nodes in the operational group;

monitoring, for each parallel algorithm running in a compute node of the operational group during the running of the parallel application, temperature in the compute node; and creating the hardware independent application profile in dependence upon the monitored temperature for each parallel algorithm run in a compute node and the hardware profile.

13. The computer program product of claim 11 wherein establishing the hardware independent application profile further comprises:

running a simulation of the parallel application in the operational group, the simulation comprising parallel algorithms representing the parallel algorithms of the parallel application, the simulation using less computational overhead than the parallel application;

monitoring, for each parallel algorithm of the simulation running in a compute node of the operational group during the running of the simulation, temperature in the compute node; and creating the hardware independent application profile in dependence upon the monitored temperature for each parallel algorithm of the simulation run in a compute node and the hardware profile.

14. The computer program product of claim 11 wherein establishing the hardware independent application profile further comprises:

establishing the hardware independent application profile in dependence upon predetermined thermal characteristics of computer program instructions of each parallel algorithm of the parallel application.

15. The computer program product of claim 11 wherein mapping, in dependence upon the hardware profile and the hardware independent application profile, each parallel algorithm of the parallel application to a compute node in the operational group further comprises:

identifying in the hardware independent application profile a parallel algorithm having thermal characteristics representing greatest heat generation in a compute node;

identifying in the hardware profile a compute node having thermal characteristics representing greatest heat dissipation;

assigning for execution the identified parallel algorithm to the identified compute node; and iteratively until all other parallel algorithms of the parallel application are assigned for execution to a compute node:
   identifying in the hardware independent application profile a next parallel algorithm having thermal characteristics representing next greatest heat generation in a compute node;
   identifying in the hardware profile a next compute node having thermal characteristics representing next greatest heat dissipation; and
   assigning for execution the identified next parallel algorithm to the identified next compute node.

* * * * *